(12) United States Patent
Fukuda

(10) Patent No.: US 9,532,123 B2
(45) Date of Patent: *Dec. 27, 2016

(54) BONE CONDUCTION SPEAKER UNIT

(71) Applicant: TEMCO JAPAN CO., LTD., Tokyo (JP)

(72) Inventor: Mikio Fukuda, Tokyo (JP)

(73) Assignee: TEMCO JAPAN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/773,873

(22) PCT Filed: Jan. 27, 2015

(86) PCT No.: PCT/JP2015/052113
§ 371 (c)(1),
(2) Date: Sep. 9, 2015

(87) PCT Pub. No.: WO2015/125566
PCT Pub. Date: Aug. 27, 2015

(65) Prior Publication Data
US 2016/0044395 A1   Feb. 11, 2016

(30) Foreign Application Priority Data
Feb. 20, 2014   (JP) .................. 2014-030991

(51) Int. Cl.
*H04R 25/00*   (2006.01)
*H04R 1/02*    (2006.01)
(Continued)

(52) U.S. Cl.
CPC .............. *H04R 1/021* (2013.01); *B06B 1/045* (2013.01); *H04M 1/03* (2013.01); *H04R 2400/03* (2013.01)

(58) Field of Classification Search
CPC ...... H04M 1/03; H04R 1/021; H04R 2400/03; H04R 1/46; H04R 9/06; H04R 1/025; H04R 2460/13; H04R 2499/11; H04R 1/1016
(Continued)

(56) References Cited

U.S. PATENT DOCUMENTS

2006/0098829 A1   5/2006  Kobayashi
2006/0165246 A1*  7/2006  Lee ...................... H04B 1/385
                                                          381/151
(Continued)

FOREIGN PATENT DOCUMENTS

JP   64067097 A     3/1989
JP   2004274593 A   9/2004
(Continued)

*Primary Examiner* — Brian Ensey
(74) *Attorney, Agent, or Firm* — Browdy and Neimark, PLLC

(57) ABSTRACT

Provided is a bone conduction speaker unit which can sufficiently prevent generation of sound leakage at non-calling. The bone conduction speaker unit includes a bone conduction speaker main body, being incorporated in a housing with an elastic base being interposed, an elastic cover being mounted on a top face of the housing. Bonding between a rear face of the bone conduction speaker main body and a top face of the elastic base, and/or bonding between the elastic base and an inner bottom face of the housing are partially made; upon the elastic cover having been mounted on the housing, a gap is held between an internal top face of the elastic cover and a top face of the bone conduction speaker main body; and with the elastic cover being pressed in use, the internal top face thereof is abutted against the top face of the bone conduction speaker main body.

13 Claims, 5 Drawing Sheets

(51) Int. Cl.
*B06B 1/04* (2006.01)
*H04M 1/03* (2006.01)

(58) Field of Classification Search
USPC .................................. 381/326, 151, 178, 380
See application file for complete search history.

(56) References Cited

U.S. PATENT DOCUMENTS

| | | |
|---|---|---|
| 2007/0160238 A1 | 7/2007 | Kobayashi |
| 2007/0160239 A1 | 7/2007 | Fukuda |
| 2009/0041269 A1* | 2/2009 | Hemer .................... H04R 17/00 381/151 |
| 2010/0316235 A1* | 12/2010 | Park ........................ H04R 1/025 381/151 |
| 2013/0329918 A1* | 12/2013 | Kubba ................. G02B 27/017 381/151 |

FOREIGN PATENT DOCUMENTS

| | | |
|---|---|---|
| JP | 2006033787 A | 2/2006 |
| JP | 4369976 B2 | 11/2009 |
| WO | 2005069586 A | 7/2005 |
| WO | 2005086522 A1 | 9/2005 |
| WO | 2007034739 A | 3/2007 |
| WO | 2008004273 A1 | 1/2008 |

\* cited by examiner

BONE CONDUCTION SPEAKER UNIT

TECHNICAL FIELD

The present invention relates to a bone conduction speaker unit, and more particularly, to a bone conduction speaker unit which, upon being incorporated in a mobile phone, or the like, will not present a problem of sound leakage.

BACKGROUND ART

The bone conduction speaker unit converts a voice signal into a vibration to transmit it to the skull, and the like, being compact and lightweight and capable of being used even under noise, whereby, in recent years, it has been widely used with communication apparatuses, such as a mobile phone, and the like.

In order to transmit a vibration of a diaphragm constituting the bone conduction speaker to the skull, a contact which is abutted against a side face of the head is fixed to the diaphragm, and for efficient transmission of the vibration of the diaphragm to the contact, the contact is fixed to the diaphragm (the plate yoke) in plane contact over a wide area (WO2005/069586A1, and the like). However, in that case, at the time of non-calling, in other words, also when the contact is not pressed against a side face of the head, the contact is vibrated together with the bone conduction speaker being operated, thereby a voice vibration (an air conduction sound) being generated, and thus generation of a certain degree of sound leakage cannot be avoided, presenting a problem.

Then, as a configuration of a bone conduction speaker unit which, at the time of non-calling, can prevent generation of sound leakage and, at the time of calling, can exert the performance comparable to that of a conventional bone conduction speaker, there has been proposed a configuration which includes an accommodating section made of an elastic material, enclosing and supporting the whole of the bone conduction speaker therein, and a movable top face covering the top of the accommodating section and being disposed in contact with a diaphragm of the bone conduction speaker so as to be vibrated therewith, the movable top face having a projection formed on the inner face thereof, and only the projection being in contact with a plate yoke fixed to the diaphragm when the communication apparatus is not in use (Japanese Patent Publication No. 4369976).

For the bone conduction speaker related to this proposal, it has been confirmed that sound leakage is fairly reduced, but to a degree which cannot be the to be sufficient. In other words, the degree of reduction is not so high as to cause the leaked sound to be practically not heard when the ear is brought to near the bone conduction speaker, but to be loudly heard once the ear is pressed against it, thereby a distinct difference in loudness being perceived. In addition, matters, such as forming a projection on the inner face of the movable top face and requiring the degree of contact with the plate yoke to be adjusted, present a problem of an increase in manufacturing cost.

CITATION LIST

Patent Literature

Patent Document 1: WO2005/069586A1
Patent Document 2: Japanese Patent Publication No. 4369976

DISCLOSURE OF THE INVENTION

Problems to be Solved by the Invention

As described above, with mobile phones, and the like, which use a conventional bone conduction speaker, the contact is always in tight contact with the plate yoke, thereby, even at the time of non-calling, when the contact is not abutted against a side face of the head, the contact being vibrated to generate a voice vibration, resulting in occurrence of sound leakage, which has been a problem. And, with the bone conduction speaker which has been conventionally proposed to solve this problem, it cannot be the that the reduction in sound leakage is sufficient, and there has been a problem of an increased manufacturing cost.

The present invention has been made to solve such problems, and it is an object of the present invention to provide a bone conduction speaker unit which, at the time of non-calling, can sufficiently prevent generation of sound leakage and, at the time of calling, can exert the performance comparable to that of a conventional bone conduction speaker, and which has a simple structure, allowing the manufacturing cost to be minimized; can be easily incorporated in a main body casing of mobile phones, and the like; and can provide a relatively thin configuration.

Means for Solving the Problems

The invention to solve the above problems that is claimed in claim 1 is a bone conduction speaker unit, including:

a bone conduction speaker main body, being incorporated in a housing with an elastic base being interposed, an elastic cover being mounted on a top face of the housing, bonding between a rear face of the bone conduction speaker main body and a top face of the elastic base, and/or bonding between the elastic base and an inner bottom face of the housing being partially made, upon the elastic cover having been mounted on the housing, a gap being held between an internal top face of the elastic cover and a top face of the bone conduction speaker main body, and with the elastic cover being pressed in use, the internal top face thereof being abutted against the top face of the bone conduction speaker main body.

In one embodiment, a portion inside of a peripheral edge part of the rear face of the bone conduction speaker main body is fixed to the top face of the elastic base, and a peripheral edge part of the rear face of the elastic base is fixed to the inner bottom face of the housing. The peripheral edge part of the rear face of the elastic base that is bonded to the inner bottom face of the housing is made consecutive or non-consecutive. In the case of where it is made non-consecutive, when the inner bottom face of the housing is square or rectangular, the elastic base is provided with a corresponding square or rectangular shape, the peripheral portions of the elastic base that are bonded to the inner bottom face of the housing being provided as two peripheral portions of the square or rectangle shape that are opposed to each other. On the other hand, when the inner bottom face of the housing is circular, the elastic base is provided with a corresponding circular shape, the peripheral portions of the elastic base that are bonded to the inner bottom face of the housing being provided as two circular-arc portions which are opposed to each other.

In a preferred embodiment, a bonding part of the bone conduction speaker main body on the top face of the elastic base is disposed so as not to vertically overlap a bonding part of the rear face of the elastic base that is bonded to the inner bottom face of the housing.

In another embodiment, a recess part is formed in the inner bottom face of the housing, and the rear face of the elastic base is bonded onto a peripheral face of the recess part. In that case, the recess part is formed to have a size equal to or larger than that of the rear face of the bone conduction speaker main body.

In another embodiment, in the internal top face of the elastic cover, there is disposed a contact which, upon the elastic cover having been pressed in use, is directly or indirectly abutted against the top face of the bone conduction speaker main body. Alternatively, in the internal top face of the elastic cover, there is disposed a thick wall part which, upon the elastic cover having been pressed in use, is directly or indirectly abutted against the top face of the bone conduction speaker main body. In the top face of the bone conduction speaker main body, there may be disposed an elastic plate which, upon the elastic cover having been pressed in use, is abutted against the internal top face of the elastic cover.

Advantages of the Invention

The present invention is as described above, and since bonding between a rear face of the bone conduction speaker main body and a top face of the elastic base, and/or bonding between the elastic base and an inner bottom face of the housing are partially made, there is provided a structure which is excellent in vibration suppressing effect (vibration transmission suppression effect), in other words, effect to make the vibration of the bone conduction speaker main body difficult to be transmitted to the housing, thereby an advantage that generation of sound leakage at the time of non-calling is sufficiently prevented is offered.

In addition, at the time of non-use, when no pressing force is applied to the elastic cover, a gap is always held between the bottom face of the contact and the top face of the elastic plate, or between the bottom face of the thick wall part and the top face of the plate yoke, which reliably prevents that an unnecessary transmission of vibration to the elastic cover results in an occurrence of sound oscillation, leading to an occurrence of sound leakage, and in use, the elastic cover is pressed against a side face of the head, or the like, thereby the bottom face of the contact or the thick-wall part that is supported by the elastic cover being pushed in toward the inside, and brought into plane contact with the plate yoke, which causes the vibration of the diaphragm to be reliably transmitted to the elastic cover, thus there being provided an advantage that the function of the bone conduction speaker being sufficiently exerted.

Further, the bone conduction speaker unit in accordance with the present invention is intended to obtain vibration suppressing effect by partially performing bonding between the rear face of the bone conduction speaker main body and the top face of the elastic base, and/or bonding between the elastic base and the inner bottom face of the housing, and the improvement in vibration suppressing effect does not depend upon the thickness of the elastic base, whereby the entire unit can be formed thin, which is another advantage; and yet the bone conduction speaker unit is completed as an independent unit with minimized sound leakage, and thus can be used, being incorporated, as it is, in a main body casing of mobile phones, and the like, which is still another advantage.

BEST MODE FOR CARRYING OUT THE INVENTION

Figure 1:
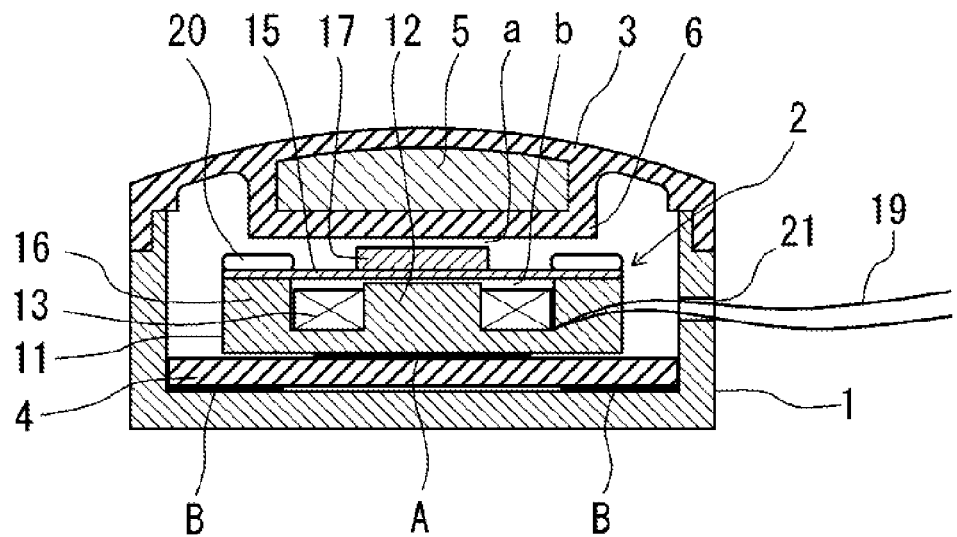
FIG. 1 is a longitudinal sectional view of a bone conduction speaker unit according to a first embodiment of the present invention.

Hereinbelow, embodiments of the present invention will be explained with reference to the accompanying drawings. First, a first embodiment illustrated in FIG. 1 to FIG. 4 will be explained. FIG. 1 is a longitudinal sectional view of a bone conduction speaker unit according to the first embodiment of the present invention, and as shown in the same figure, the bone conduction speaker unit includes a housing 1; a bone conduction speaker main body 2 incorporated in the housing 1; and an elastic cover 3 mounted on the housing 1, upon the elastic cover 3 having been mounted on the housing 1, a gap ' a' being held between an internal top face of the elastic cover 3 and a top face of the bone conduction speaker main body 2, and with the elastic cover 3 being pressed in use, the internal top face thereof being abutted against the top face of the bone conduction speaker main body 2.

Figure 7:
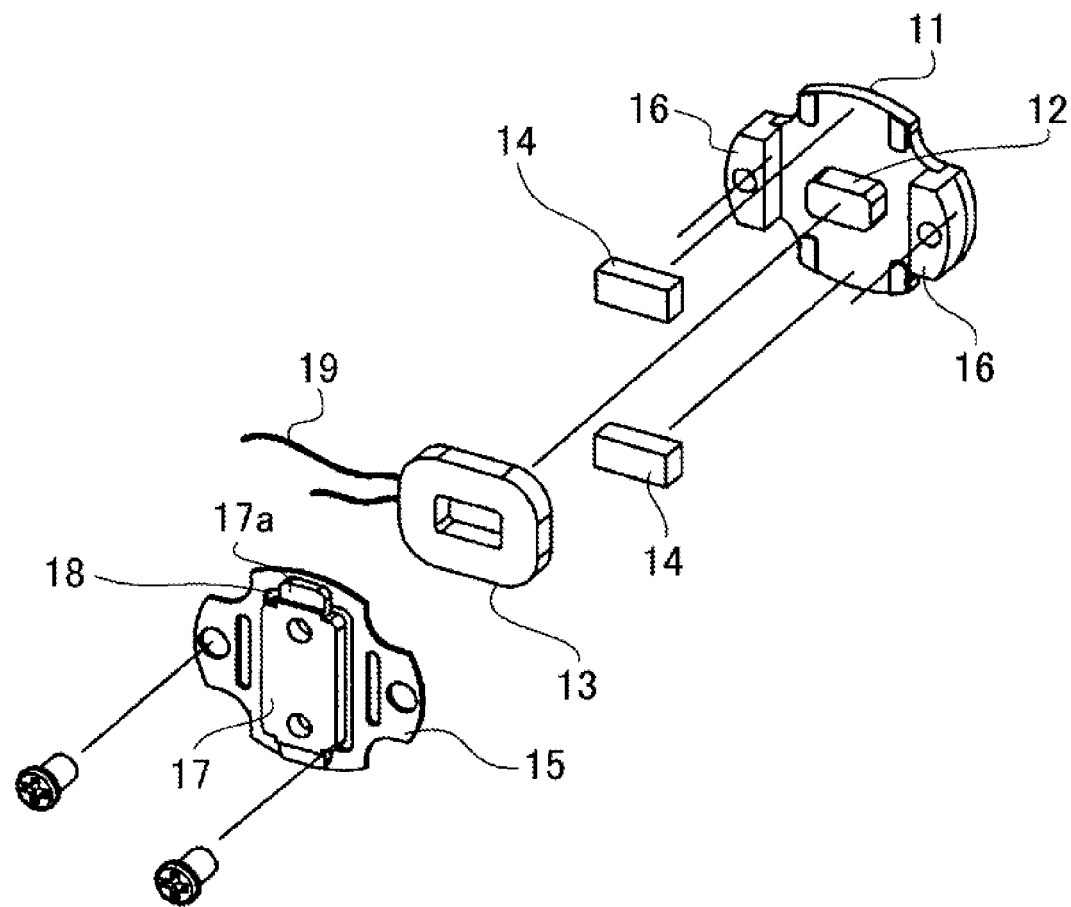
FIG. 7 is an exploded perspective view of a bone conduction speaker main body of the bone conduction speaker unit in accordance with the present invention.

The bone conduction speaker main body 2 is configured as shown in, for example, FIG. 7, with a voice coil 13 being disposed so as to surround a center pole 12 provided in the central portion of a yoke 11, a pair of bar-like magnets 14, 14 being fixed to both sides of the voice coil 13, and a diaphragm 15 being disposed so as to cover the voice coil 13 and the magnets 14, 14. Both end parts of the diaphragm 15 are fixed, through set screws 20, or the like, to the top face of side walls 16 which are erected on both end parts of the yoke 11 (see FIGS. 1 and 2). At that time, a gap 'b' is provided between the diaphragm 15 and the top face of the voice coil 13.

In the diaphragm 15, an opening 18 which is oblong and has a size corresponding to the size of a plate yoke 17 is formed, and the plate yoke 17 is disposed on the opening 18, being positioned so as to longitudinally straddle it, with both end parts 17a in a longitudinal direction of the plate yoke 17 being fixed to the edge parts of the opening 18 (see FIG. 7). Thus, the plate yoke 17 is vibrated along with the vibration of the diaphragm 15. The above embodiment provides a so-called outer shell configuration, in which the magnets 14, 14 are disposed outside of the voice coil 13, however, contrarily to such configuration, a so-called inner shell configuration, in which the magnet (also serving as the center pole) is disposed inside the voice coil, may be provided.

The housing 1 is an accommodating element, generally made of a hard resin, and the elastic cover 3 is formed of a rubber material, having a low hardness, such as silicone rubber or urethane rubber, being mounted on the housing 1 to be connected thereto. In the side wall of the housing 1, there is formed an opening for pulling out lead wires 19 extending from the voice coil 13.

With the bone conduction speaker unit according to the first embodiment of the present invention, the bone conduction speaker main body 2 configured as above is incorporated in the housing 1 with the elastic base 4 being interposed, and bonding between the rear face of the bone conduction speaker main body 2 (the yoke 11) and the top face of the elastic base 4, and/or bonding between the elastic base 4 and the inner bottom face of the housing 1 are/is partially made. In the examples shown in the figures, both bonding between the rear face of the bone conduction speaker main body 2 (the yoke 11) and the top face of the elastic base 4, and bonding between the elastic base 4 and the inner bottom face of the housing 1 are partially made.

The elastic base 4 is provided with a shape and a size which correspond to the size of the inner bottom face of the housing 1 against which it is to be abutted; for example, in the case where the inner bottom face is square or rectangular, the elastic base 4 is formed in a square or rectangular shape having a corresponding size, while, in the case where the inner bottom face is circular, the elastic base 4 is formed in a circular shape having a corresponding diameter. The elastic base 4 is manufactured by using, for example, a foamed material, such as urethane foam or acrylic foam, or a rubber material, having a low hardness, such as silicone rubber or urethane rubber.

The bone conduction speaker main body 2 is fixed to the elastic base 4 with the rear face of the yoke 11 of the bone conduction speaker main body 2 being partially bonded to the top of the elastic base 4. In this case, only the portion (the bonding part A) of the rear face of the yoke 11 that is inside of the peripheral edge part thereof is fixed to the top face of the elastic base 4. The fixing is generally performed with an adhesive tape or a bonding agent.

In addition, the elastic base 4 is fixed to the inner bottom face of the housing 1 with the rear face of the elastic base 4 being partially bonded to the inner bottom face of the housing 1. For example, only the peripheral edge part (the bonding part B) of the rear face of the elastic base 4 is bonded to be fixed to the inner bottom face of the housing 1, and the portion inside thereof is left to be unbonded. The bonding part B may be made consecutive or non-consecutive. For example, in the case where the inner bottom face of the housing 1 is square or rectangular, the elastic base 4 is provided with a corresponding square or rectangular shape, and the bonding part B of the rear face of the elastic base 4 may be in the shape of a square or rectangle, or only the two peripheral portions of the square or rectangle shape that are opposed to each other may be provided as the bonding part B (see FIG. 3). In addition, in the case where the inner bottom face of the housing is circular, the elastic base 4 is provided with a corresponding circular shape, and the bonding part B of the rear face of the elastic base 4 may be doughnut-shaped, or only the two circular-arc portions which are opposed to each other may be provided as the bonding part B (see FIG. 4).

Thus, in the case where not only the bone conduction speaker main body 2 (the yoke 11) but also the elastic base 4 are to be partially bonded to be fixed, it is preferable that the bonding part A of the yoke 11 on the elastic base 4 be located inside of the bonding part B of the elastic base 4 on the inner bottom face of the housing 1. In other words, it is preferable that the bonding portion of the top face of the elastic base 4 (the bonding part A) and the bonding portion of the bottom face thereof (the bonding part B) do not overlap each other in a vertical direction. In the example shown in FIG. 3, the bonding part A of the yoke 11 is provided with a shape of a square or rectangle having a size which is accommodated between the bonding parts B on both sides of the elastic base 4, while, in the example shown in FIG. 4, the bonding part A of the yoke 11 is provided with a shape of a circle having a size which is accommodated between the bonding parts B on both sides of the elastic base 4.

By providing the above-described configuration, the vibration suppressing effect, in other words, the vibration transmission suppression effect which allows the vibration of the bone conduction speaker main body 2 to be prevented from being transmitted to the housing 1 can be still more enhanced. In that case, the larger the area of the portion where the bonding portion A does not overlap the bonding portion B, the higher the vibration suppressing effect will be.

In the embodiment illustrated with FIG. 1, in the internal top face of the elastic cover 3, there is formed a holding part 6 for a contact 5, which is made of a hard resin, that can be contacted with or separated from the plate yoke 17 of the bone conduction speaker main body 2. The holding part 6 shown in FIG. 6 holds the entire contact 5, including the bottom face, however, as in the later described embodiment, there may be provided a configuration in which the contact 5 is held such that the bottom face thereof is exposed (see FIG. 6).

Figure 2:
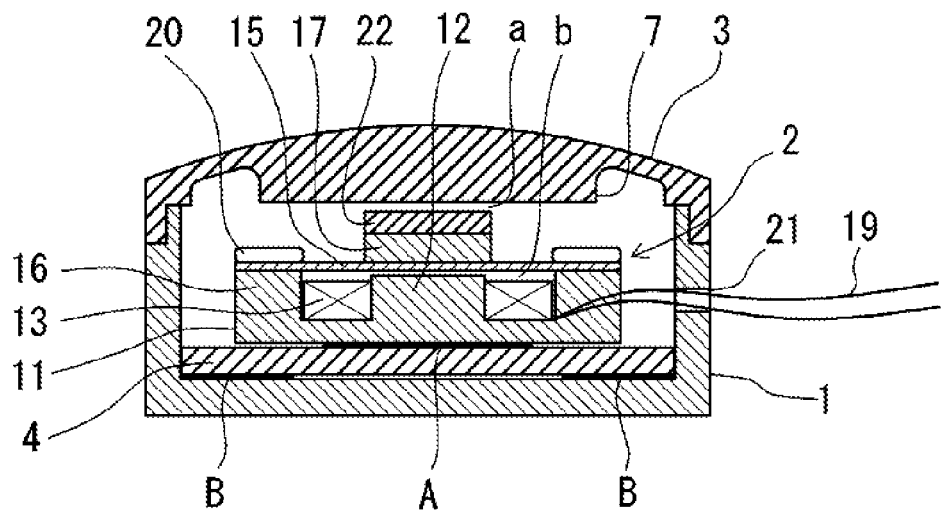
FIG. 2 is a longitudinal sectional view of a bone conduction speaker unit according to a variation of the first embodiment of the present invention.
Figure 3:
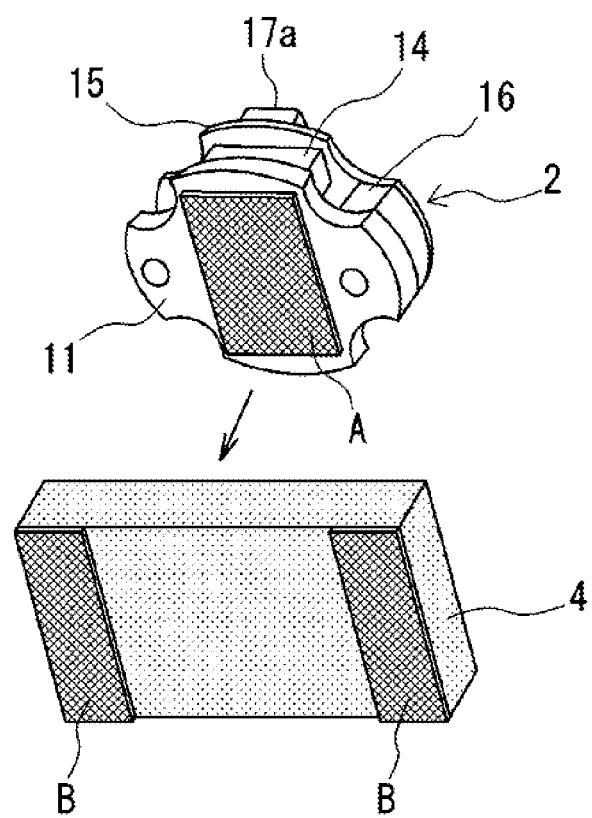
FIG. 3 is an exploded perspective view of a critical portion of the bone conduction speaker unit according to the first embodiment of the present invention.
Figure 4:
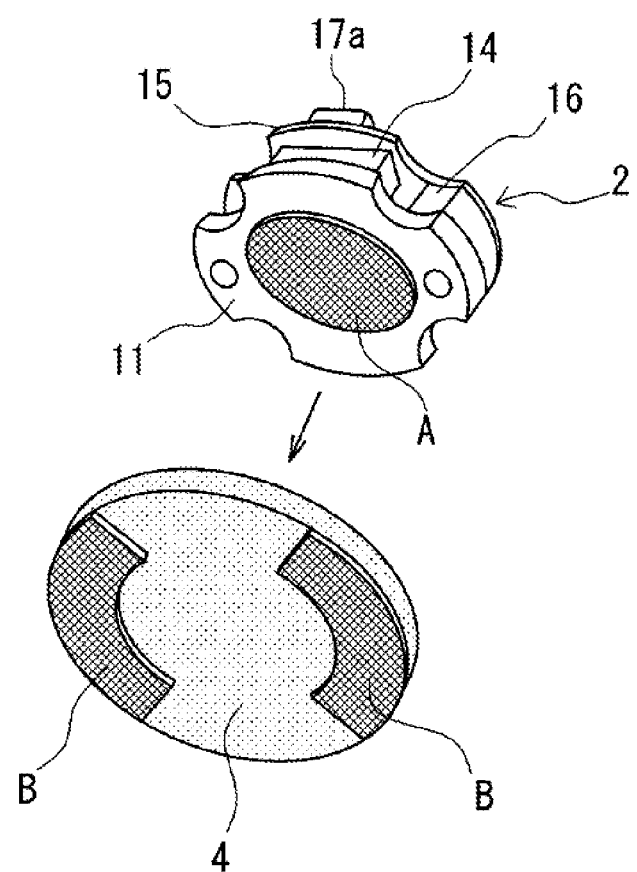
FIG. 4 is an exploded perspective view of a critical portion of the bone conduction speaker unit according to the variation of the first embodiment of the present invention.

In the example shown in FIG. 2, there is provided a configuration in which, instead of disposing the contact 5 in the internal top face of the elastic cover 3, a thick wall part 7, which is provided with a flat bottom face, is formed in the internal top face of the elastic cover 3, and when the elastic cover 3 is loaded on the housing 1, a gap 'a' is held between the bottom face of the thick wall part 7 and the top face of the plate yoke 17 of the bone conduction speaker main body 2. In this case, as needed, there is a configuration in which an elastic plate 22, which is made of the same material as that of the elastic base 4, is fixed to the top face of the plate yoke 17, with a gap 'a' being held between this elastic plate and the bottom face of the thick wall part 7. The configuration about the points other than the above-described one is the same as that in the example shown in FIG. 1. The configuration in which, instead of the contact 5, the thick wall part 7 is provided can also be adopted even in the case of the later-described second embodiment.

In the case of this first embodiment, the bone conduction speaker main body 2 is loaded into the housing 1 generally with the elastic base 4 having been partially fixed to the rear face of the yoke 11 of the bone conduction speaker main body 2 in advance, and is disposed in the inside of the housing 1 by partially fixing the elastic base 4 to the inner bottom face of the housing 1. And then, the lead wires 19 extending from the voice coil 13 are pulled out from the wiring opening 21 provided in the side wall of the housing 1.

Thereafter, the elastic cover 3 is fitted to the housing 1, however, the bone conduction speaker unit is designed such that, at that time, a gap 'a' is secured between the bottom face of the contact 5 (the holding part 6) or that of the thick wall part 7 and the plate yoke 17. This gap 'a' is set to provide a distance which allows the bottom face of the contact 5 (the holding part 6) or that of the thick wall part 7 to be reliably brought into a tight contact with the plate yoke 17 when the elastic cover 3 is pressed with a certain degree of force, in other words, when, in use, the elastic cover 3 is pressed against a side face of the head, or the like, resulting in the elastic cover 3 being pushed in toward the inside.

The vibration output of the bone conduction speaker main body 2 is generated with a part of the bone conduction speaker main body 2 being contacted with the housing 1, and therefore, at the time of non-calling, the bone conduction speaker main body 2 is required to be held in a floated state in the housing 1 as much as possible in order to prevent from being brought into direct contact with the housing 1. However, with the bone conduction speaker unit configured as above in accordance with the present invention, the bone conduction speaker main body 2 is fixed to the inner bottom face of the housing 1 through the elastic base 4 disposed on the rear face of the yoke 11 of the bone conduction speaker main body 2, and at the time of non-calling, the plate yoke 17 is supported, being separated from the contact 5 in the internal top face of the elastic cover 3 or the thick wall part 7 by a distance of the gap 'a', whereby it can be the that an ideal configuration in which the entire bone conduction speaker main body 2 will not be directly contacted with the housing 1 being provided.

The yoke 11 is a portion which is difficult to transmit a vibration, as compared to the vibration system portion, in other words, the portion consisting of the diaphragm. 15 and the plate yoke 17 fixed thereto, and thus, simply by interposing the elastic base 4 between the yoke 11 and the inner bottom face of the housing 1, an isolation from the housing 1 can be provided. However, in that case, the isolation effect depends upon the thickness of the elastic base 4, and therefore, in order to secure a sufficient isolation effect, the elastic base 4 is required to have a certain degree of thickness, which can be an obstruction in thinning of the entire unit.

However, the bone conduction speaker unit in accordance with the present invention is provided with a configuration in which the bone conduction speaker main body 2 is incorporated in the housing 1 with the elastic base 4 being interposed, and therefore, the vibration which is transmitted from the bone conduction speaker main body 2 to the housing 1 is not only buffered to be reduced by the elastic base 4, but also, since the bone conduction speaker main body 2 is configured to be partially bonded to be fixed to the top face of the elastic base 4, the vibration transmission suppression effect for the housing 1 is more enhanced. Further, in the case where the elastic base 4 is configured to be partially bonded to the inner bottom face of the housing 1, the vibration transmission suppression effect for the housing 1 is still more enhanced.

Figure 5:
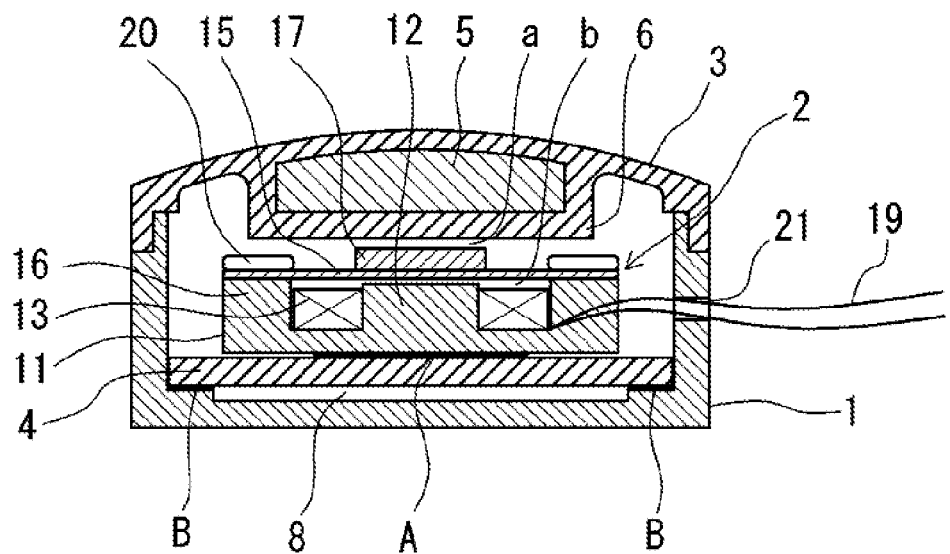
FIG. 5 is a longitudinal sectional view of a bone conduction speaker unit according to a second embodiment of the present invention.
Figure 6:
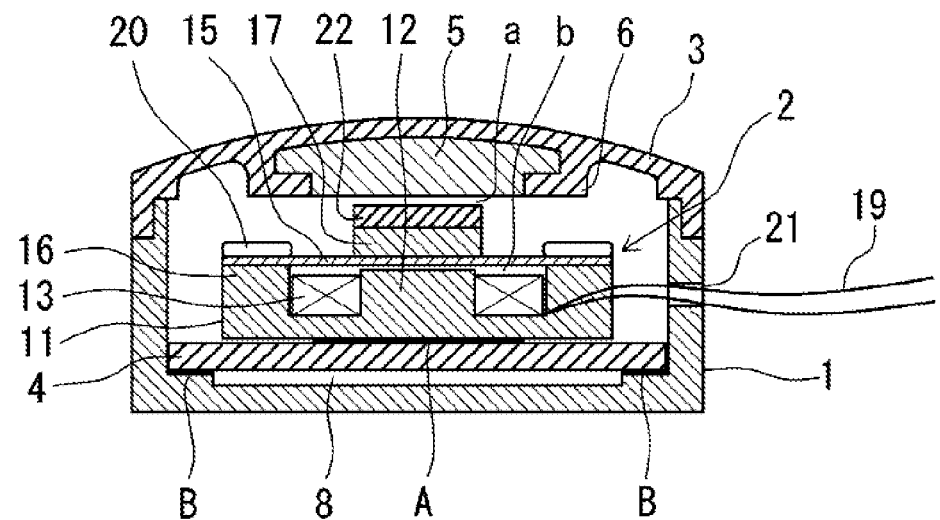
FIG. 6 is a longitudinal sectional view of a bone conduction speaker unit according to a variation of the second embodiment of the present invention.

Next, a second embodiment illustrated with FIG. 5 and FIG. 6 will be explained. The second embodiment is the same as the above first embodiment in that there is provided a bone conduction speaker unit configured by incorporating the bone conduction speaker main body 2 in the housing 1 on the top face of which the elastic cover 3 is to be mounted, wherein the bone conduction speaker main body 2 is incorporated in the housing 1 with the elastic base 4 being interposed, and wherein bonding of the bone conduction speaker main body 2 to the elastic base 4 may be partially performed. The second embodiment differs from the first embodiment in that a shallow recess part 8 is formed in the inner bottom face of the housing 1, and the elastic base 4 is bonded onto a peripheral edge bank of the recess part 8 while the portion of the elastic base 4 that corresponds to the recess part 8 being provided as a non-bonding part. In this case, it is preferable that the recess part 8 have a size larger than that of the rear face of the yoke 11.

By thus forming a shallow recess part 8 in the inner bottom face of the housing 1, while making the portion of the elastic base 4 that corresponds to the recess part 8 to be a non-bonding part, the degree of contact of the bone conduction speaker main body 2 with the housing 1 is more reduced with the isolation effect being enhanced, and thus at the time of non-calling, the vibration output of the bone conduction speaker main body 2 is made more difficult to be transmitted to the housing 1. The configurations other than that in which the recess part 8 is thus provided, and the functions are the same as those in the first embodiment.

In either of the above first and second embodiments, at the time of non-calling, when a pressing force is not applied to the elastic cover 3, the plate yoke 17 (or the elastic plate 22) is separated from the contact 5 (or the thick-wall part 7) by a distance of the gap 'a', and therefore, even if the plate yoke 17 (or the elastic plate 22) is vibrated, the vibration will not be transmitted to the contact 5 (or the thick-wall part 7), thereby an unintended sound leakage being prevented from being generated.

Further, at the time of calling, if the elastic cover 3 is pressed against a side face of the head, or the like, the elastic cover 3 is pushed in toward the inside, the bottom face of the contact 5 (or the thick-wall part 7) is brought into plane contact with the plate yoke 17 (or the elastic plate 22). In this state, if a vibration is generated by a voice signal, the vibration is transmitted to the contact 5 (or the thick-wall part 7) through the plate yoke 17 (or the elastic plate 22), and from the contact 5 (or the thick-wall part 7), to the skull, thus a bone conduction speech reception being made possible. At this time, since there exists the elastic plate 22 or the holding part 6, which is an elastic material, between the plate yoke 17 and the contact 5, there is no possibility that the plate yoke 17 and the thick-wall part 7 may be contacted with each other, resulting in an abnormal noise being generated.

The bone conduction speaker unit in accordance with the present invention is configured as above, being completed as an independent unit with minimized sound leakage, and thus can be used, being incorporated, as it is, in a main body casing of mobile phones, and the like, by an optional method of mounting, which means it offers excellent usability. In addition, a gap 'a' is secured between the plate yoke 17 (the elastic plate 22) and the contact 5 (the thick wall part 7), whereby sound leakage at the time of non-calling can be reliably prevented. Further, since the bone conduction speaker main body 2 is loaded in the housing 1 to which the elastic cover 3 is tightly fitted, whereby there is no need for separately taking measures against moisture and dust.

Hereinabove, the present invention has been explained in detail to some extent, and about the most preferred embodiment, however, since it is obvious that a wide range of different embodiments can be made without departing from the spirit and scope of the present invention, it is to be understood that the present invention is not limited to the specific embodiments thereof except as defined in the appended claims.

DESCRIPTION OF SYMBOLS

Reference symbol 1 denotes a housing; 2 a bone conduction speaker main body; 3 an elastic cover; 4 an elastic base; 5 a holding part; 6 a contact; 7 a thick wall portion; 8 a recess part; 11 a yoke; 12 a center pole; 13 a voice coil; 14 a magnet; 15 a diaphragm; 16 a side wall; 17 a plate yoke; 18 an opening; 19 lead wires; 20 a set screw; 21 a wiring port; 22 an elastic plate; 'a' a gap; 'b' a gap; 'A' a bonding portion; and 'B' a bonding portion.

The invention claimed is:

1. A bone conduction speaker unit, comprising:
a bone conduction speaker main body, being incorporated in a housing with an elastic base being interposed, an elastic cover being mounted on a top face of said housing,
bonding between a rear face of said bone conduction speaker main body and a top face of said elastic base, and/or bonding between said elastic base and an inner bottom face of said housing being partially made,
upon said elastic cover having been mounted on said housing, a gap being held between an internal top face of said elastic cover and a top face of said bone conduction speaker main body, and
with said elastic cover being pressed in use, the internal top face thereof being abutted against the top face of said bone conduction speaker main body.

2. The bone conduction speaker unit according to claim 1, wherein a portion inside of a peripheral edge part of the rear face of said bone conduction speaker main body is fixed to the top face of said elastic base.

3. The bone conduction speaker unit according to claim 1, wherein a peripheral edge part of the rear face of said elastic base is fixed to the inner bottom face of said housing.

4. The bone conduction speaker unit according to claim 3, wherein the peripheral edge part of the rear face of said elastic base that is bonded to the inner bottom face of said housing is consecutive.

5. The bone conduction speaker unit according to claim 3, wherein the peripheral edge part of the rear face of said elastic base that is bonded to the inner bottom face of said housing is non-consecutive.

6. The bone conduction speaker unit according to claim 5, wherein the inner bottom face of said housing is square or rectangular, and said elastic base has a corresponding square or rectangular shape, the peripheral portions of said elastic base that are bonded to the inner bottom face of said housing being two peripheral portions of the square or rectangle shape that are opposed to each other.

7. The bone conduction speaker unit according to claim 5, wherein the inner bottom face of said housing is circular, and said elastic base has a corresponding circular shape, the peripheral portions of said elastic base that are bonded to the inner bottom face of said housing being two circular-arc portions which are opposed to each other.

8. The bone conduction speaker unit according to claim 3, wherein a bonding part of said bone conduction speaker main body on the top face of said elastic base is disposed so as not to vertically overlap a bonding part of the rear face of said elastic base that is bonded to the inner bottom face of said housing.

9. The bone conduction speaker unit according to claim 3, wherein a recess part is formed in the inner bottom face of said housing, and the rear face of said elastic base is bonded onto a peripheral face of said recess part.

10. The bone conduction speaker unit according to claim 9, wherein said recess part is provided with a size equal to or larger than that of the rear face of said bone conduction speaker main body.

11. The bone conduction speaker unit according to claim 1, wherein, in the internal top face of said elastic cover, there is disposed a contact which, upon said elastic cover having been pressed in use, is directly or indirectly abutted against the top face of said bone conduction speaker main body.

12. The bone conduction speaker unit according to claim 1, wherein, in the internal top face of said elastic cover, there is disposed a thick wall part which, upon said elastic cover having been pressed in use, is directly or indirectly abutted against the top face of said bone conduction speaker main body.

13. The bone conduction speaker unit according to claim 1, wherein, in the top face of said bone conduction speaker main body, there is disposed an elastic plate which, upon said elastic cover having been pressed in use, is abutted against the internal top face of said elastic cover.

* * * * *